United States Patent
Shin

(10) Patent No.: US 12,545,187 B2
(45) Date of Patent: Feb. 10, 2026

(54) SURROUNDING SURVEILLANCE APPARATUS FOR VEHICLE

(71) Applicant: SL Mirrortech Corporation, Siheung-si (KR)

(72) Inventor: Youngnam Shin, Siheung-si (KR)

(73) Assignee: SL Mirrortech Corporation, Siheung-si (KR)

( * ) Notice: Subject to any disclaimer, the term of this patent is extended or adjusted under 35 U.S.C. 154(b) by 0 days.

(21) Appl. No.: 18/667,653

(22) Filed: May 17, 2024

(65) Prior Publication Data

US 2024/0391387 A1    Nov. 28, 2024

(30) Foreign Application Priority Data

May 26, 2023   (KR) .......................... 10-2023-0068345

(51) Int. Cl.
| | |
|---|---|
| *B60R 1/25* | (2022.01) |
| *G06T 3/40* | (2024.01) |
| *G06T 7/50* | (2017.01) |
| *G06V 20/58* | (2022.01) |

(52) U.S. Cl.
CPC .................. *B60R 1/25* (2022.01); *G06T 3/40* (2013.01); *G06T 7/50* (2017.01); *G06V 20/58* (2022.01)

(58) Field of Classification Search
CPC .... B60R 1/25; G06T 3/40; G06T 7/50; G06V 20/58
See application file for complete search history.

(56) References Cited

U.S. PATENT DOCUMENTS

| | | | | |
|---|---|---|---|---|
| 2007/0047809 A1* | 3/2007 | Sasaki | .................... | G06V 20/56 382/170 |
| 2010/0253539 A1* | 10/2010 | Seder | .................. | G01C 21/365 340/902 |
| 2011/0293145 A1* | 12/2011 | Nogami | ................. | G08G 1/167 382/103 |
| 2013/0190944 A1* | 7/2013 | Brandin | ................. | G01C 21/26 701/1 |
| 2014/0132707 A1* | 5/2014 | Hashimoto | .......... | H04N 13/239 348/36 |

(Continued)

FOREIGN PATENT DOCUMENTS

DE   102006012773 A1 * 11/2006 ............... B60R 1/30

OTHER PUBLICATIONS

A. Mukhtar, L. Xia and T. B. Tang, "Vehicle Detection Techniques for Collision Avoidance Systems: a Review," in IEEE Transactions on Intelligent Transportation Systems, vol. 16, No. 5, pp. 2318-2338, Oct. 2015.*

*Primary Examiner* — Shahan Ur Rahaman
(74) *Attorney, Agent, or Firm* — United One Law Group LLC; Kongsik Kim; Jhongwoo Peck

(57) ABSTRACT

A surrounding surveillance apparatus for a vehicle includes an image acquisition unit that acquires an image in a vicinity of the vehicle; a vehicle detection unit configured to detect a nearby vehicle in the image and sets a detection region corresponding to the detected nearby vehicle; and an image processing unit configured to adjust values of pixels in at least some portions within the detection region. In particular, the image processing unit is configured to cause a proportion of areas where the values of the pixels are adjusted with respect to a designated region of the surrounding image to be less than a predetermined ratio.

12 Claims, 10 Drawing Sheets

(56) References Cited

U.S. PATENT DOCUMENTS

| | | | |
|---|---|---|---|
| 2016/0180176 A1* | 6/2016 | Yamamoto | B60W 30/08 |
| | | | 382/103 |
| 2019/0092239 A1* | 3/2019 | Yamada | H04N 23/73 |
| 2019/0248288 A1* | 8/2019 | Oba | B60R 1/26 |
| 2021/0081684 A1* | 3/2021 | Yamamoto | B62D 15/0275 |
| 2024/0282120 A1* | 8/2024 | Kibayashi | G06V 20/584 |

* cited by examiner

☒ : BLUE COLOR WEIGHT 100
ⓐ : BLUE COLOR WEIGHT 50
ⓑ : BLUE COLOR WEIGHT 30
ⓒ : BLUE COLOR WEIGHT 20

SURROUNDING SURVEILLANCE APPARATUS FOR VEHICLE

CROSS-REFERENCE TO RELATED APPLICATION

This application claims priority from Korean Patent Application No. 10-2023-0068345 filed on May 26, 2023, which is incorporated herein by reference in its entirety.

BACKGROUND

1. Technical Field

The present disclosure relates to a surrounding surveillance apparatus for a vehicle, and more particularly, to a surrounding surveillance apparatus for a vehicle, which is designed to display nearby vehicles located within a surrounding image of the vehicle and thereby allows the driver to easily recognize the positions of the nearby vehicles.

2. Description of the Related Art

Generally, while it is easier to monitor the front of a vehicle from the driver's seat, monitoring the vehicle's sides and rear is relatively more difficult. Blind pots occur, and many accidents involving personal injuries or structural damages during vehicle operation occur in these blind spots.

When drivers operate vehicles, they monitor the surroundings, especially the blind spots, through one or more mirrors equipped in the vehicles. However, monitoring through the mirrors requires the driver's continuous attention, leading to increased fatigue. Additionally, there are limits to promoting safe driving due to the obstruction of view caused by the vehicles themselves.

Recently, imaging devices (e.g., cameras) have been installed in the vehicles, and surrounding images captured by these imaging devices are displayed on display devices equipped in the vehicles. This allows the drivers to more easily check nearby vehicles located around their vehicles and more readily respond to them.

During vehicle operation, it can be difficult for drivers to recognize nearby vehicles within the surrounding images displayed on the display device. Therefore, there is a demand for a solution that enables easier recognition of nearby vehicles located within the surrounding images.

SUMMARY

Aspects of the present disclosure provide a surrounding surveillance apparatus for a vehicle that allows for easier identification of a nearby vehicle within a surrounding image by assigning weights for adjusting at least one color to pixels included in at least some regions within the surrounding image that corresponds to the nearby vehicle.

Aspects of the present disclosure also provide a surrounding surveillance apparatus for a vehicle that prevents the reduction of the driver's visibility by ensuring that the proportion of a region within the surrounding image, where weights for adjusting at least one color are assigned, does not exceed a predetermined ratio.

However, aspects of the present disclosure are not restricted to those set forth above. The above and other aspects of the present disclosure will become more apparent to one of ordinary skill in the art to which the present disclosure pertains by referencing the detailed description of the present disclosure given below.

According to an aspect of the present disclosure, a surrounding surveillance apparatus for a vehicle may include an image acquisition unit (e.g., an imaging device) that acquires an image in a vicinity of the vehicle; a vehicle detection unit configured to detect a nearby vehicle in the image and sets a detection region corresponding to the detected nearby vehicle in the image; and an image processing unit configured to adjust values of pixels in at least some portions within the detection region. In particular, the image processing unit may be configured to cause a proportion of areas where the values of the pixels are adjusted with respect to a designated region of the image to be less than a predetermined ratio.

The vehicle detection unit may be configured to detect exterior contours of the nearby vehicle, and the image processing unit may be configured to assign weights for adjusting at least one color of the pixels to such pixels that correspond to the detected contours. The at least one color may be determined based on a body color of the nearby vehicle. The at least one color may be varied depending on a distance between the vehicle and the nearby vehicle.

The image processing unit may be configured to assign different weights for adjusting the values of the pixels to the pixels corresponding to the detected contours and to a predetermined number of adjacent pixels to each of the pixels corresponding to the detected contours, based on a change in a distance between the vehicle and the nearby vehicle. The image processing unit may be configured to assign a greater weight for adjusting the values of the pixels to the pixels corresponding to the detected contours than to their respective adjacent pixels. The image processing unit may be configured to assign a smaller weight for adjusting the values of the pixels to the adjacent pixels that are disposed at a greater distance from each of the pixels corresponding to the detected contours.

The image processing unit may be configured to adjust a proportion of areas of pixel regions where weights for adjusting at least one color of the pixels are assigned with respect to the detection region, based on an area occupied by the detection region within the designated region of the image. The image processing unit may be configured to arrange first regions, where the weights are assigned, and second regions, where no weights are assigned, to be alternately arranged in at least one direction within the detection region.

The image processing unit may be configured to adjust at least one of a size of the first regions in at least one direction, a size of the second regions in the at least one direction, or a distance between the first regions and the second regions in the at least one direction based on the area occupied by the detection region within the designated region of the image.

According to the aforementioned and other embodiments of the present disclosure, there are one or more of the following effects.

By preventing the proportion of an area within a surrounding image, where weights for adjusting at least one color of the pixels are assigned, with respect to a designated region within the surrounding image from exceeding a predetermined ratio, nearby vehicles located within the surrounding image can be more easily recognized, and the reduction of visibility due to the region where the weights for adjusting the at least one color are assigned can be prevented.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
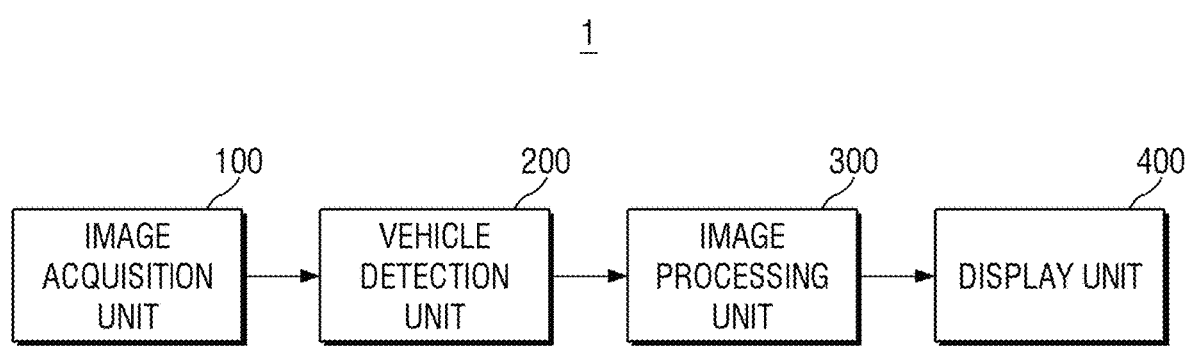
FIG. 1 is a block diagram illustrating the configuration of a surrounding surveillance apparatus for a vehicle according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be more thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Herein, although exemplary embodiments are described as using a plurality of units to perform the exemplary processes, it is to be understood that the exemplary processes may also be performed by one or plurality of modules (computer implemented software modules). Additionally, it is to be understood that the term "unit" may refer to a hardware device that may include a memory and a processor. The memory may be configured to store the modules and the processor may be configured to execute said modules to perform one or more processes which are described herein.

A surrounding surveillance apparatus for a vehicle according to some embodiments of the present disclosure will hereinafter be described with reference to the accompanying drawings.

FIG. 1 is a block diagram illustrating the configuration of a surrounding surveillance apparatus for a vehicle according to an embodiment of the present disclosure.

Referring to FIG. 1, a surrounding surveillance apparatus 1 for a vehicle may include an image acquisition unit 100, a vehicle detection unit 200, and an image processing unit 300.

Figure 2:
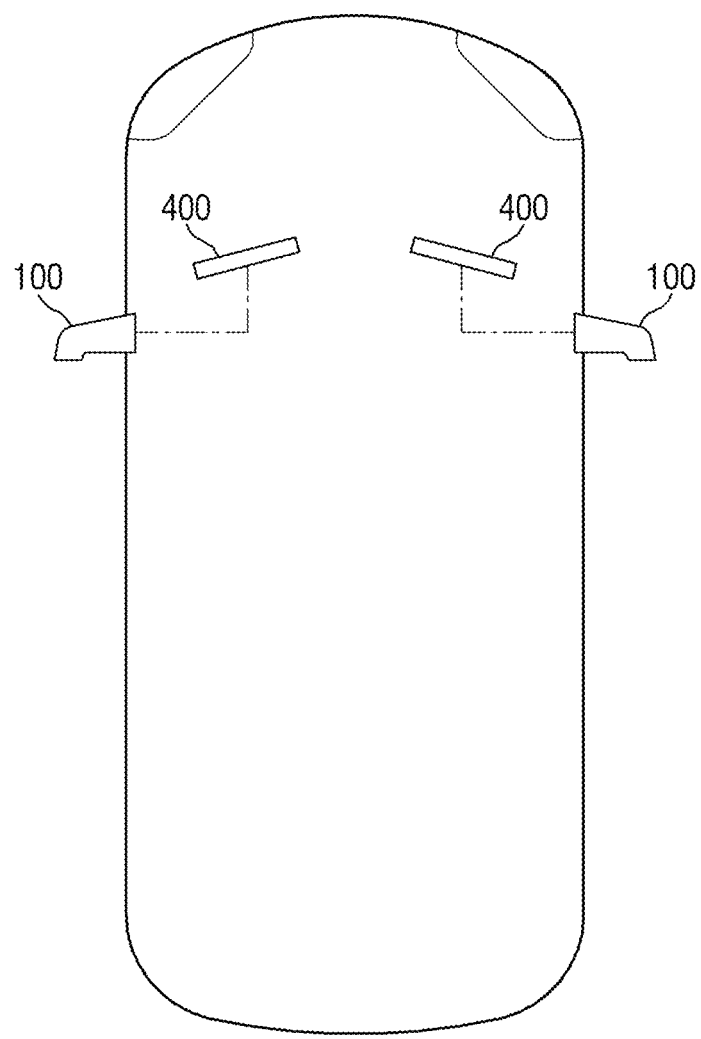
FIG. 2 is a schematic diagram illustrating an image acquisition unit and a display unit according to an embodiment of the present disclosure.

The image acquisition unit 100 may include at least one imaging device (e.g., camera) that captures an image in at least one direction in the vicinity of the vehicle. The image acquisition unit 100 may be installed on or near both front doors, thereby capturing images of the vehicle's rear sides, as illustrated in FIG. 2.

Images captured by the image acquisition unit 100 may be displayed via a display unit 400 (e.g., a display device), which is provided in the vehicle. The image acquisition unit 100 may be installed on both sides of the vehicle, and the display unit 400 may be provided to respectively display images captured by the image acquisition unit 100.

An image captured by the image acquisition unit 100 will hereinafter be referred to a as surrounding image, and at least some portions of the surrounding image may be extracted to be displayed on the display units 400, suitable for the size and resolution of the display unit 400.

Figure 3:
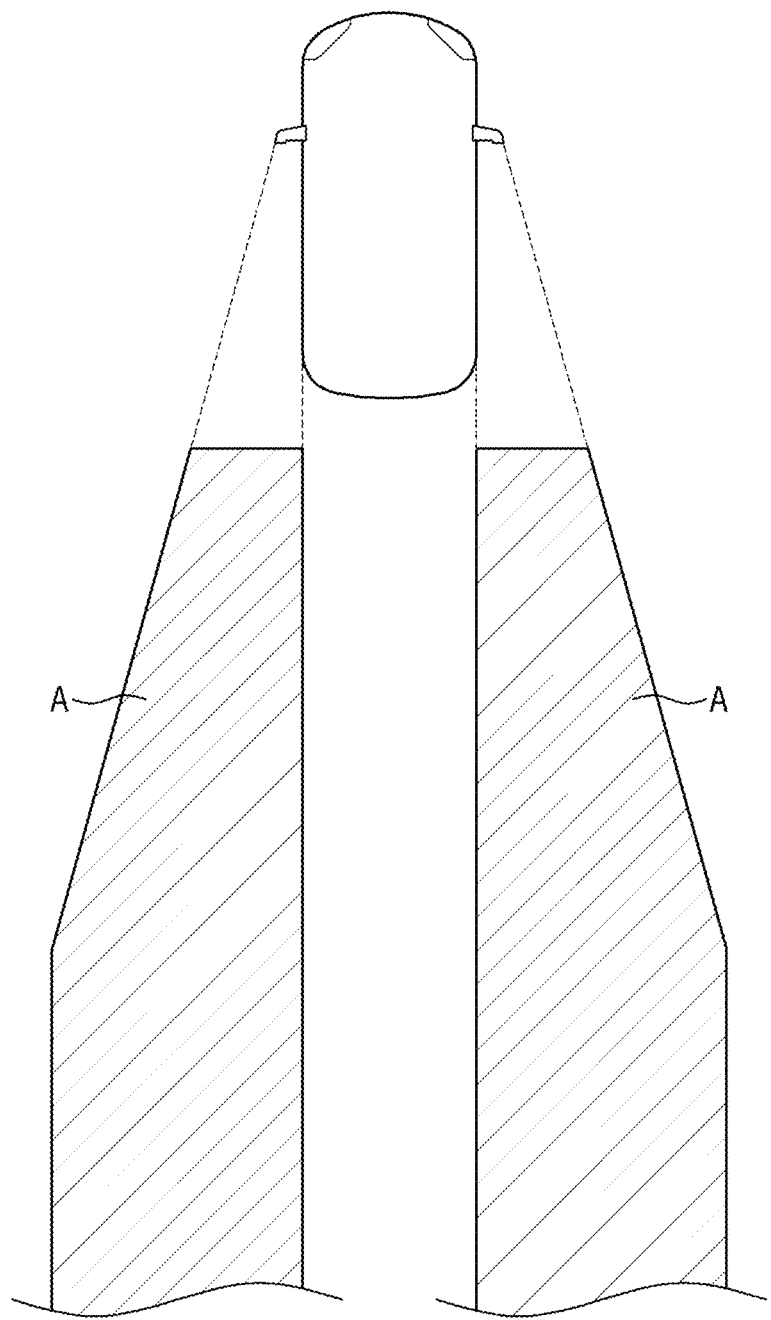
FIGS. 3 and 4 are schematic diagrams illustrating designated regions according to an embodiment of the present disclosure.
Figure 4:
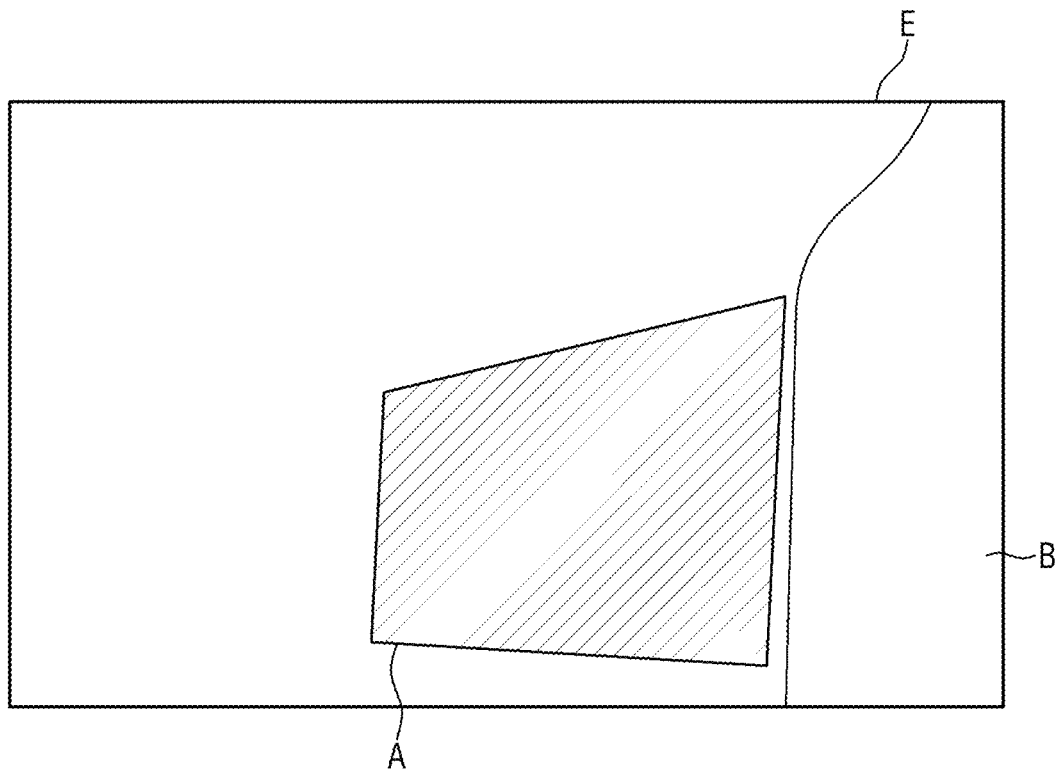

Meanwhile, referring to FIGS. 3 and 4, a surrounding image E captured by the image acquisition unit 100 may include a part B of the vehicle and a designated region A that corresponds to the field of view extending to the horizon at the rear of the vehicle. The designated region A may be configured based on the regulations defined in UN/ECE Regulation No. 46 as Class I, II, III, IV, V, VI, or the like. The designated region A may be understood as Class II.

For convenience, the designated region A will hereinafter be described as being smaller than the surrounding image E, but the present disclosure is not limited thereto. Alternatively, the designated region A may be of the same size as or of a smaller size than the surrounding image E.

The designated region A may correspond to a region defined by regulations to enable the driver to recognize and respond to the road conditions at the vehicle's rear sides more easily during driving. If the visibility for the designated region A is not sufficiently ensured, the likelihood of vehicle accidents increases. Therefore, the proportion of obscured portions within the designated region A may be required to be below a predetermined ratio.

This is because if the obscured portions within the designated region A exceed the predetermined ratio, recognition of a nearby vehicle located within the designated region A in the surrounding image E may become more difficult, potentially compromising the driver's visibility for the vehicle's rear sides.

The obscuration of the original image within the designated region A may also include, for example, displaying On-Screen Display (OSD) images for changing the field of view on the image, such as pan and tilt, displaying images for warning of the approach of rear vehicles, and altering the values of at least some pixels corresponding to nearby vehicles within the surrounding image E to display the positions of the nearby vehicles.

The predetermined ratio may be set to 10%, but the present disclosure is not limited thereto. The predetermined ratio may vary from state to state, country to country, or from region to region.

The vehicle detection unit 200 may be configured to detect nearby vehicles located within the surrounding image E. Since the image acquisition unit 100 acquires surrounding images for the vehicle's rear sides by the image acquisition unit 100, the vehicle detection unit 200 will hereinafter be described as detecting nearby vehicles located at the vehicle's rear sides.

The vehicle detection unit 200 may be configured to use different detection methods between day and night. For example, during the day time, the vehicle detection unit 200 may be configured to detect nearby vehicles using edge detection within the surrounding image E, and at night time, the vehicle detection unit 200 may be configured to detect nearby vehicles using the detection of headlights or taillights. However, the present disclosure is not limited to this example. The vehicle detection unit 200 may be configured to use various other detection methods capable of detecting nearby vehicles within the surrounding image E.

Figure 5:
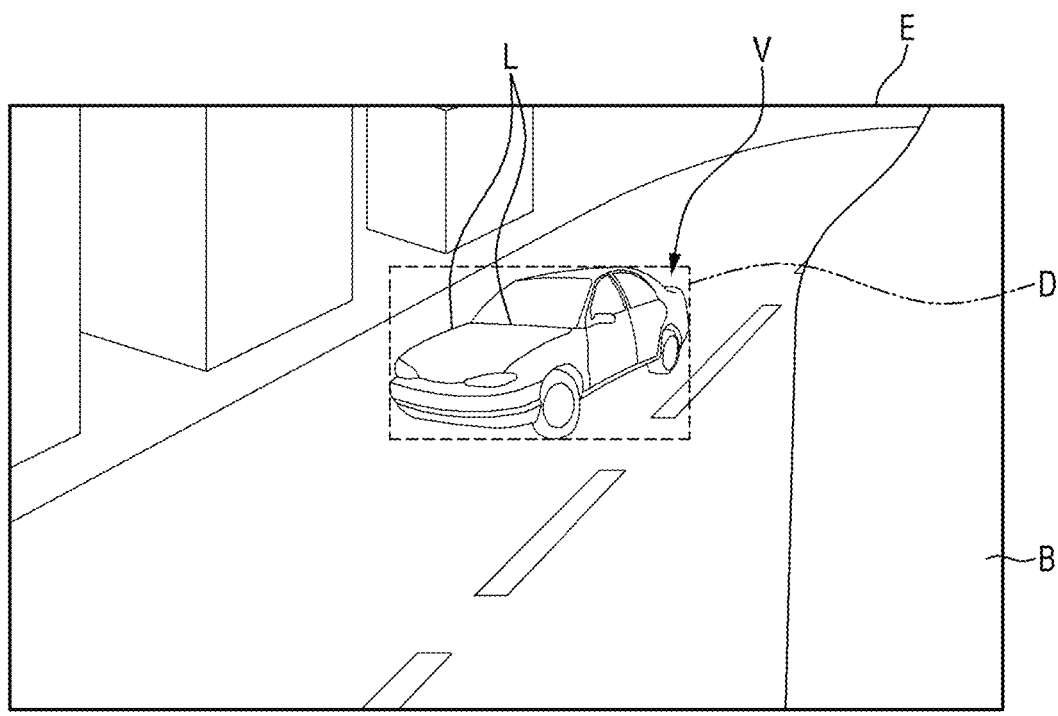
FIG. 5 is a schematic diagram illustrating a detection region for a nearby vehicle within a surrounding image according to an embodiment of the present disclosure.

In other words, referring to FIG. 5, the vehicle detection unit 200 may be configured to detect a nearby vehicle V located within the surrounding image E acquired by the image acquisition unit 100 and may set a detection region D corresponding to the detected nearby vehicle V.

The detection region D may have a rectangular shape encompassing the nearby vehicle V, but the present disclosure is not limited thereto. Alternatively, the detection region D may be configured as a region formed by the outermost edges of the nearby vehicle V within the surrounding image E.

The image processing unit 300 may be configured to adjust the values of pixels in at least some portions of the nearby vehicle V within the detection region D detected by the vehicle detection unit 200, thereby making it easier for the driver to recognize the nearby vehicle V within the surrounding image E displayed by the display unit 400.

The adjustment of pixel values by the image processing unit 300 may be understood as assigning either positive or negative weights for adjusting at least one color.

Figure 6:
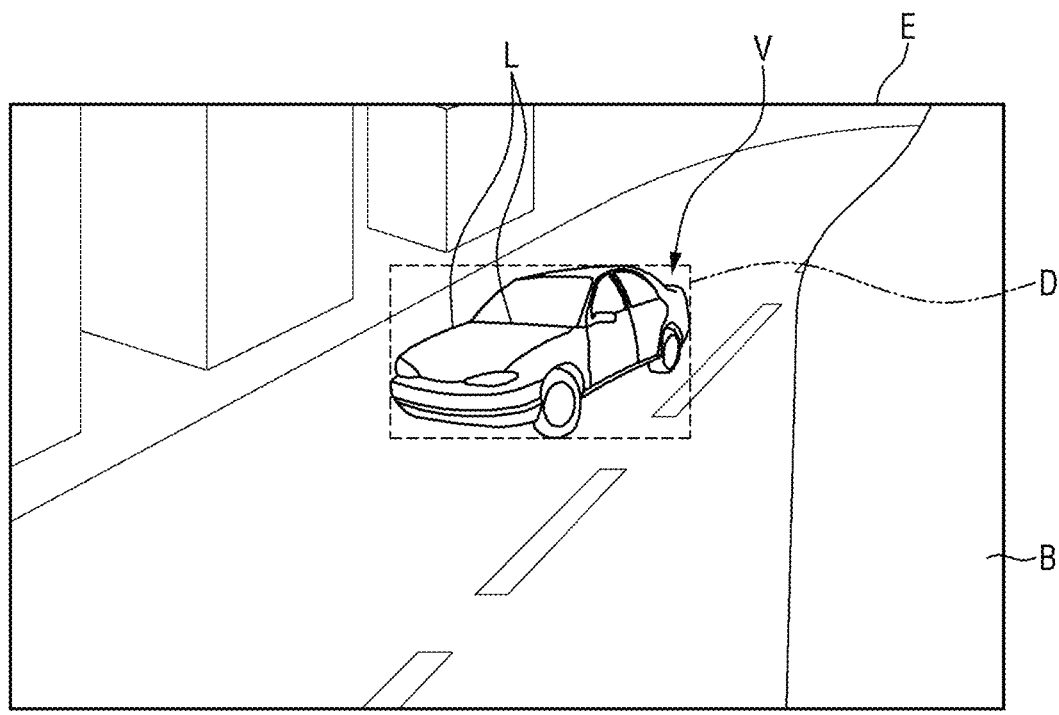
FIG. 6 is a schematic diagram illustrating a surrounding image where weights for adjusting at least one color are assigned to the contours of a nearby vehicle.

For example, if the detection region D is set as illustrated in FIG. 5, the image processing unit 300 may be configured to extract contours L of the nearby vehicle V and may change the color of the contours L of the nearby vehicle V by adjusting the weights assigned for at least one color for the pixels corresponding to the extracted contours L, as illustrated in FIG. 6.

The adjustment of the weights assigned for at least one color (such as red, green, or blue) for pixels may be understood as increasing or decreasing the positive or negative weights assigned to the at least one color.

In FIGS. 5 and 6, while the contours L of the nearby vehicle V are displayed with different thicknesses, such depiction is to indicate that they are displayed in different colors.

Furthermore, for at least one color, a predefined weight may be applied to the contours L of FIG. 6, and such weights may be adjusted to be easily distinguishable from the body color of the vehicle.

Meanwhile, the contours L of the nearby vehicle V may be understood as regions where there is a sudden change in brightness within the surrounding image E, and processes such as shadow or background discrimination in the surrounding image E may be used to eliminate contours other than those of nearby vehicles V.

The image processing unit 300 may be configured to change the color of the contours L of the nearby vehicle V within the surrounding image E to indicate the position of the nearby vehicle V (e.g., to emphasize the position of the nearby vehicle V in the image), but the present disclosure is not limited thereto. Alternatively, the image processing unit 300 may be configured to indicate the direction of movement of the nearby vehicle V based on the change in distance between the instant vehicle and the nearby vehicle V.

The distance between the instant vehicle and the nearby vehicle V may be detected by various sensors installed on the vehicle, such as an image sensor, a LiDAR sensor, a radar sensor, an ultrasonic sensor, an infrared sensor, or the like. The image processing unit 300 may be configured to display the direction of movement of the nearby vehicle V based on the sensor data.

A change in the distance between the vehicle and the nearby vehicle V may indicate relative forward or backward movement due to the acceleration or deceleration of either the instant vehicle or the nearby vehicle V. Thus, to allow the driver to respond to the direction of movement of the nearby vehicle V, the image processing unit 300 may be configured to produce a trailing effect by varying the weights assigned for at least one color between one or more pixels that are laterally adjacent to at least some of the pixels corresponding to the contours L.

Figure 7:
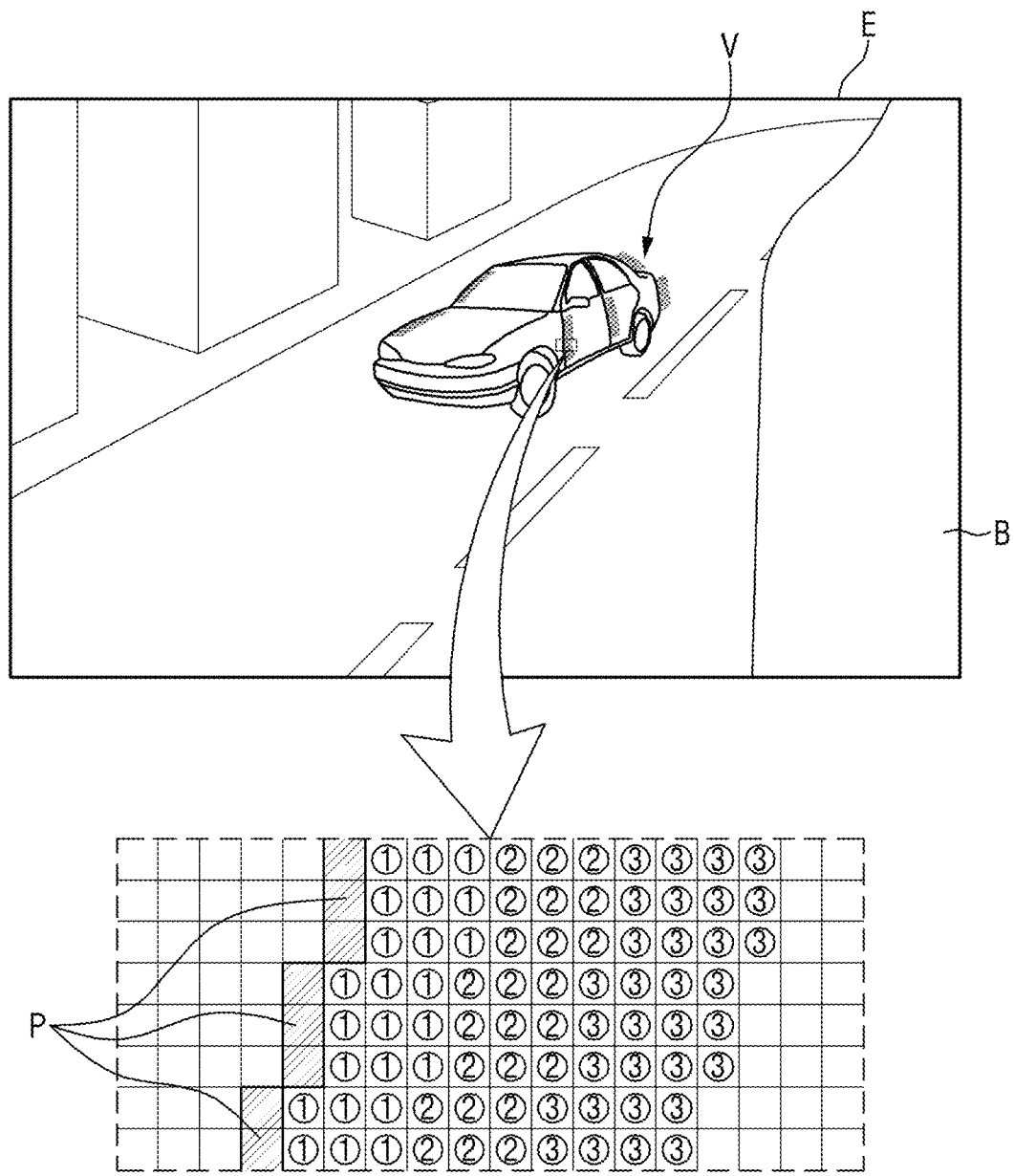
FIGS. 7 and 8 are schematic diagrams showing weights assigned to pixels corresponding to the contours of a nearby vehicle and their adjacent pixels based on a change in the distance between the vehicle and the nearby vehicle.

For example, referring to FIG. 7, if the distance between the vehicle and the nearby vehicle V gradually decreases, the image processing unit 300 may be configured to assign weights for adjusting at least one color to a predetermined number of pixels laterally adjacent to each of at least some pixels P corresponding to the contours L in the surrounding image E toward the rear direction of the nearby vehicle V.

More specifically, referring to FIG. 7, red color weights may be applied to the pixels P and ten adjacent pixels to the right of each of the pixels P. By way of example, a red color weight of 100 may be applied to the pixels P, and for the ten adjacent pixels to the right of each of the pixels P, a red color weight of 50 may be applied to the first three adjacent pixels ((1)), a red color weight of 30 to the subsequent three pixels ((2), and a red color weight of 20 to the last four pixels (3)). This creates a lighter red hue going away from the pixels P, producing a trailing effect (or a motion blur effect) that signifies that the nearby vehicle V is moving closer to the vehicle.

The red color weights of 100, 50, 30, and 20 in the example of FIG. 7 are merely exemplary, and the actual applied weights may vary.

Figure 8:
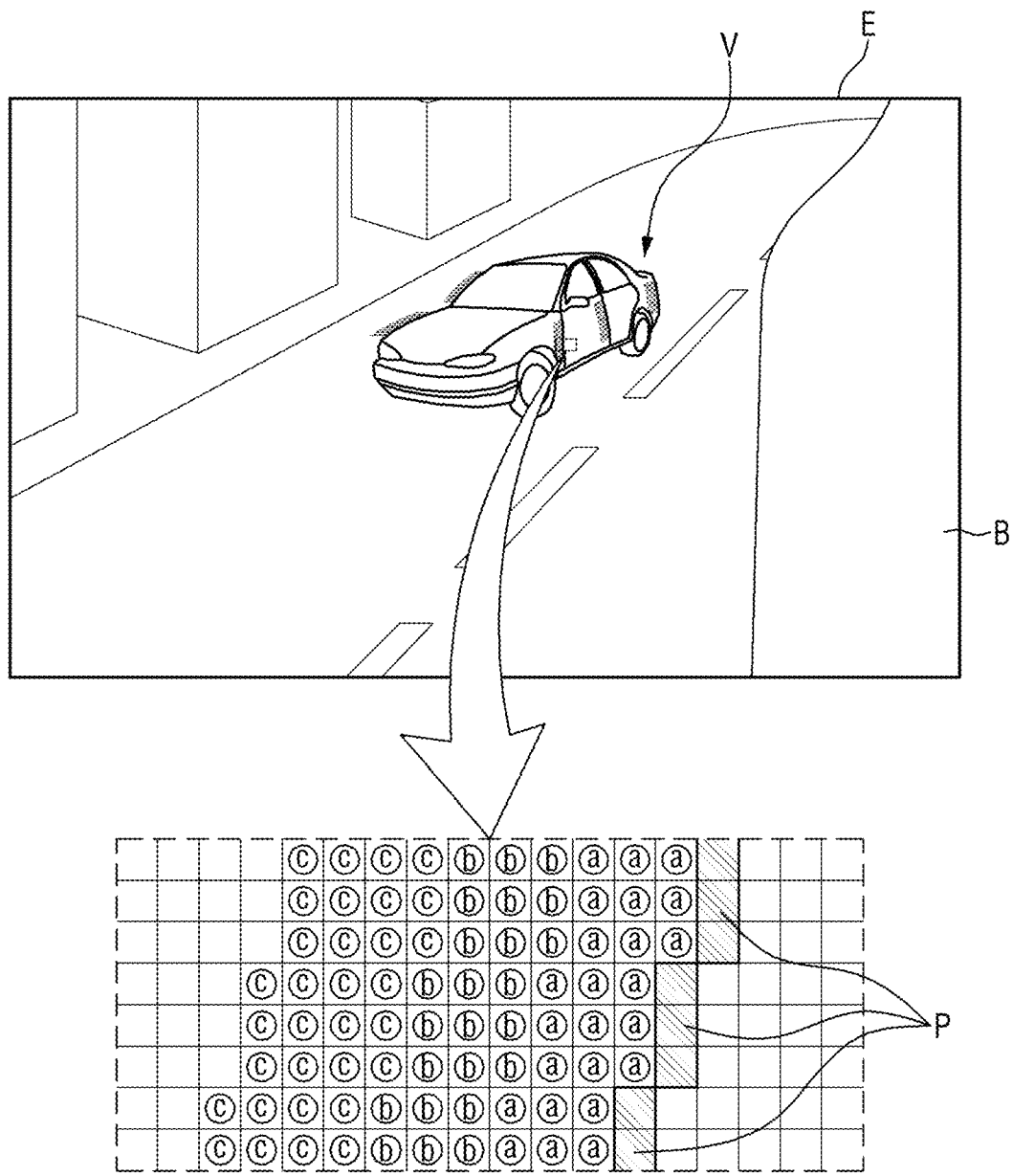

Additionally, if the distance between the vehicle and the nearby vehicle V gradually increases, the image processing unit 300 may be configured to configure the weights assigned for adjusting at least one color to vary between a predetermined number of pixels laterally adjacent to each of the pixels P toward the forward direction of the nearby vehicle V, as illustrated in FIG. 8.

More specifically, referring to FIG. 8, blue color weights may be applied to the pixels P and ten adjacent pixels to the left of each of the pixels P. By way of example, a blue color weight of 100 may be applied to the pixels P, and for the ten adjacent pixels to the left of each of the pixels P, a blue color weight of 50 may be applied to the first three adjacent pixels (ⓐ), a blue color weight of 30 to the subsequent three pixels (ⓑ), and a blue color weight of 20 to the last four pixels (ⓒ). This creates a lighter blue hue going away from the pixels P, producing a trailing effect (or a motion blur effect) that signifies that the nearby vehicle V is moving away from the vehicle.

The weights may be assigned for the red color when the nearby vehicle V is moving closer to the vehicle, and the weights may be assigned for the blue or green color when the nearby vehicle V is moving away from the vehicle. However, the present disclosure is not limited to this. The weights may also be assigned for other colors depending on the distance between the vehicle and the nearby vehicle V.

For example, the weights may be assigned for the green color when the distance between the vehicle and the nearby vehicle V is greater than a threshold distance, and the weights may be assigned for the red color when the distance between the vehicle and the nearby vehicle V is less than the threshold distance. In some embodiments, different colors may be assigned to indicate the rate of distance change. By way of example, the weights may be assigned for the blue color when the rate of approach is between a first value and a second value, for the yellow color when between the second value and a third value, for the orange color when between the third value and a fourth value, and for the red color when between the fourth value and a fifth value. In some embodiments, the colors may be assigned based on the combination of the distance and the rate of distance change.

Additionally, for at least one color, different weights may be assigned to ten laterally adjacent pixels to each of the pixels P corresponding to the contours L, but the present disclosure is not limited thereto. Alternatively, the number of adjacent pixels that are subject to the weights assigned for at least one color and the corresponding weights may vary depending on the proximity of the adjacent pixels to the contours L. Furthermore, the number of adjacent pixels that are subject to the weights may also variously changed based on the resolution of the display device, actual dimensions of the display device, or the like.

As explained above, the image processing unit 300 may be configured to visually indicate whether the nearby vehicle V is approaching or receding relative to the vehicle by increasing the weight applied to the pixels P corresponding to the contours L of the nearby vehicle V, and at the same time, assigning different weights to a predetermined number of laterally adjacent pixels to the contours L.

An example where the weights assigned for at least one color are varied for the pixels P corresponding to the contours L of the nearby vehicle V has been described, but the present disclosure is not limited to this example. Alternatively, the detection region D, corresponding to the nearby vehicle V, may be configured to include regions where the weights assigned for at least one color are varied and regions where the weights assigned for at least one color are not varied. For convenience of description, the former regions will hereinafter be referred to as first regions D1, and the latter areas will hereinafter be referred to as second regions D2.

In other words, since the designated region A needs to ensure that the obscured portions within the designated region A remain below the predetermined ratio, the proportions of the first regions D1 and the second regions D2 within the detection region D may be changed based on the size of the nearby vehicle V appearing in the surrounding image E.

Figure 9:
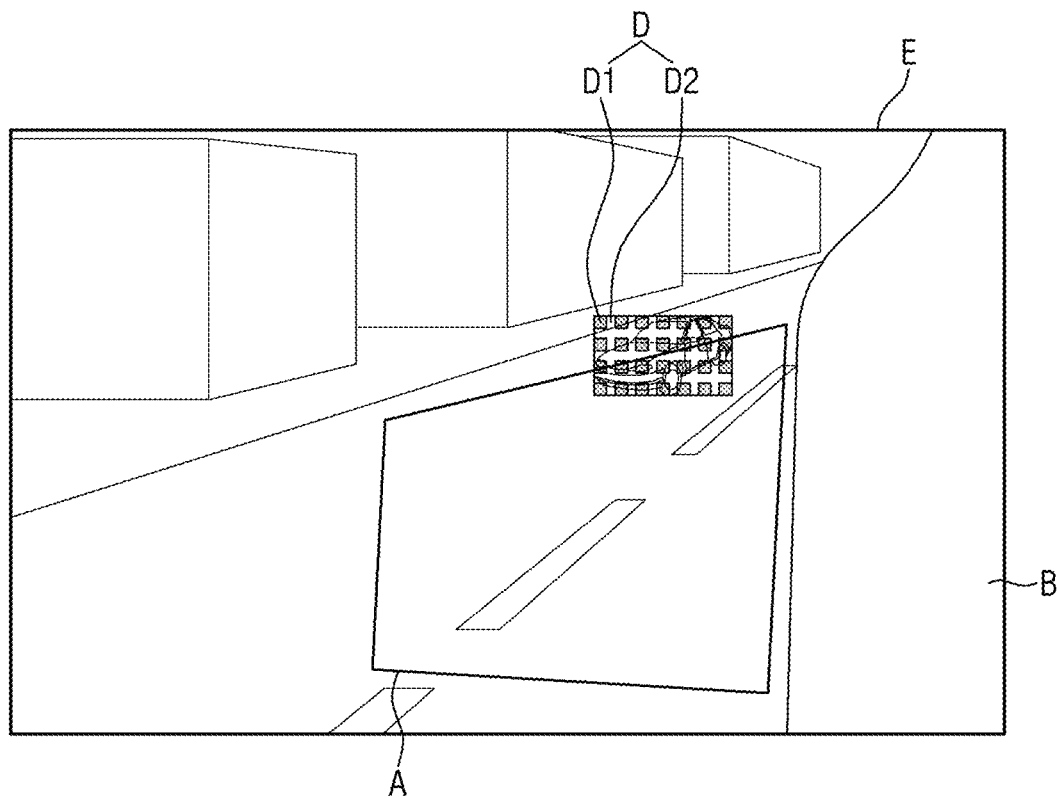
FIGS. 9 and 10 are schematic diagrams illustrating first regions and second regions that are formed based on the area occupied by a detection regions within a designated region.
Figure 10:
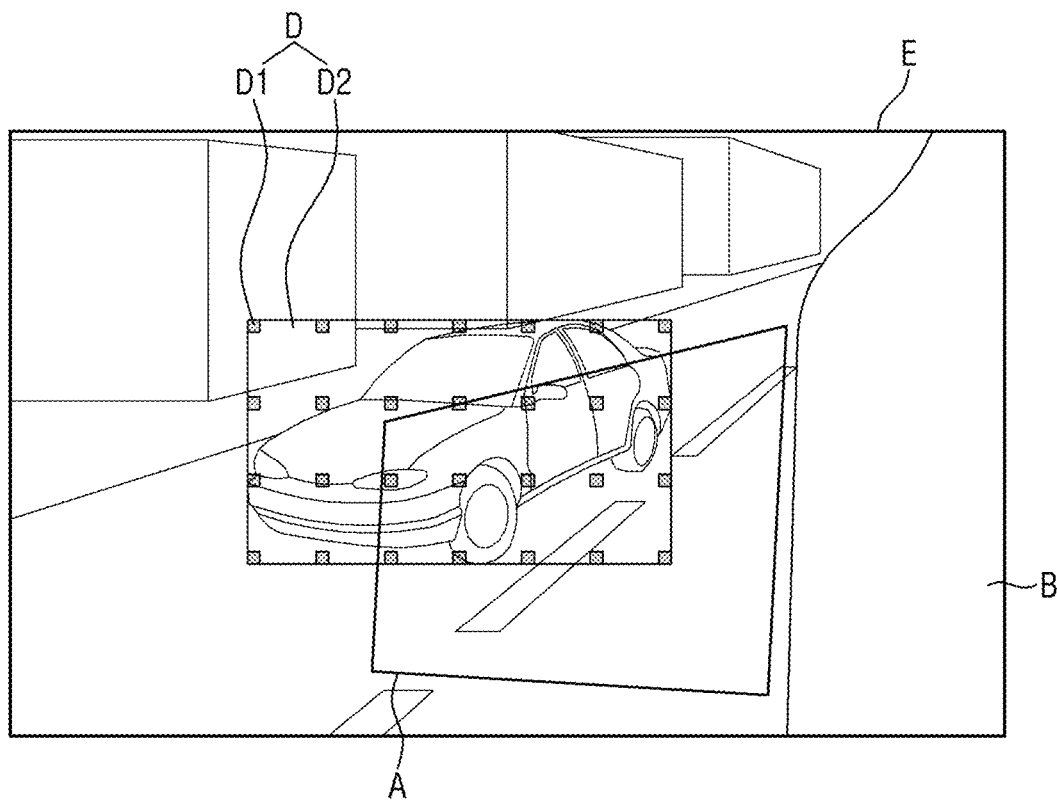

For this purpose, referring to FIGS. 9 and 10, the first regions D1 and the second regions D2 may be alternately formed in at least one direction such that the proportions of the first regions D1 and the second regions D2 within the detection region D may change based on the size of the nearby vehicle V at a rear side of the vehicle appearing on the display device, and at least one of the size of the first regions D1 in the at least one direction, the size of the second regions D2 in the at least one direction, or the distance between the first regions D1 and the second regions D2 in the at least one direction may be altered based on the size of the nearby vehicle V.

In other words, when the size of the nearby vehicle V changes with respect to the surrounding image E, as illustrated in FIGS. 9 and 10, the area occupied by the nearby vehicle V within the designated region A may be changed. In this case, if the first regions D1 and the second regions D2 are formed in the same manner, the proportion of the obscured portions within the designated region A may exceed the predetermined ratio.

Therefore, if the area occupied by the nearby vehicle V within the designated region A is relatively larger as illustrated in FIG. 10, adjusting the sizes of the first regions D1 and the second regions D2 in at least one direction, and the gap between the first regions D1 and the second regions D2, may ensure that the proportion of the obscured portions within the designated region A, i.e., the proportion of the first regions D1, remains below the predetermined ratio.

The first regions D1 and the second regions D2 may be alternately formed in at least one direction within the detection region D, but the present disclosure is not limited thereto. Alternatively, if the proportion of the area occupied by the nearby vehicle V within the designated region A is sufficiently small, the entire detection region D may consist only of the first regions D1 while the second regions D2 may be omitted.

As described above, the surrounding surveillance apparatus 1 can ensure that the proportion of a portion of the designated region A that is obscured by the nearby vehicle V remain below the predetermined ratio, based on the area occupied by the nearby vehicle V within the designated region A of the surrounding image E. Therefore, a reduction in visibility for the designated region A can be prevented.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A surrounding surveillance apparatus for a vehicle, comprising:
   an image acquisition unit that acquires an image in a vicinity of the vehicle;
   a vehicle detection unit configured to detect a nearby vehicle in the image and sets a detection region corresponding to the detected nearby vehicle in the image; and an image processing unit configured to adjust values of pixels in at least some portions within the detection region, wherein the image processing unit is configured to cause a proportion of areas where the values of the pixels are adjusted with respect to a designated region of the image to be less than a predetermined ratio, wherein the vehicle detection unit is configured to detect contours of the nearby vehicle, wherein the image processing unit is configured to assign weights for adjusting at least one color of the pixels to such pixels that correspond to the detected contours, and wherein the image processing unit is configured to assign a greater weight for adjusting the values of the pixels to the pixels corresponding to the detected contours than to their respective adjacent pixels.

2. The surrounding surveillance apparatus of claim 1, wherein the at least one color is determined based on a body color of the nearby vehicle.

3. The surrounding surveillance apparatus of claim 1, wherein the at least one color varies depending on a distance between the vehicle and the nearby vehicle.

4. A surrounding surveillance apparatus for a vehicle, comprising:
an image acquisition unit that acquires an image in a vicinity of the vehicle;
a vehicle detection unit configured to detect a nearby vehicle in the image and sets a detection region corresponding to the detected nearby vehicle in the image; and
an image processing unit configured to adjust values of pixels in at least some portions within the detection region, wherein the image processing unit is configured to cause a proportion of areas where the values of the pixels are adjusted with respect to a designated region of the image to be less than a predetermined ratio, wherein the vehicle detection unit is configured to detect contours of the nearby vehicle, wherein the image processing unit is configured to assign weights for adjusting at least one color of the pixels to such pixels that correspond to the detected contours, and wherein the image processing unit is configured to assign different weights for adjusting the values of the pixels to the pixels corresponding to the detected contours and to a predetermined number of adjacent pixels to each of the pixels corresponding to the detected contours, based on a change in a distance between the vehicle and the nearby vehicle.

5. The surrounding surveillance apparatus of claim 4, wherein the image processing unit is configured to assign a greater weight for adjusting the values of the pixels to the pixels corresponding to the detected contours than to their respective adjacent pixels.

6. The surrounding surveillance apparatus of claim 4, wherein the image processing unit is configured to assign a smaller weight for adjusting the values of the pixels to the adjacent pixels that are disposed at a greater distance from each of the pixels corresponding to the detected contours.

7. The surrounding surveillance apparatus of claim 1, wherein the image processing unit is configured to adjust a proportion of areas of pixel regions where weights for adjusting at least one color of the pixels are assigned with respect to the detection region, based on an area occupied by the detection region within the designated region of the image.

8. The surrounding surveillance apparatus of claim 7, wherein the image processing unit is configured to arrange first regions, where the weights are assigned, and second regions, where no weights are assigned, to be alternately arranged in at least one direction within the detection region.

9. The surrounding surveillance apparatus of claim 7, wherein the image processing unit is configured to adjust at least one of a size of the first regions in at least one direction, a size of the second regions in the at least one direction, or a distance between the first regions and the second regions in the at least one direction based on the area occupied by the detection region within the designated region of the image.

10. The surrounding surveillance apparatus of claim 4, wherein the image processing unit is configured to adjust a proportion of areas of pixel regions where weights for adjusting at least one color of the pixels are assigned with respect to the detection region, based on an area occupied by the detection region within the designated region of the image.

11. The surrounding surveillance apparatus of claim 10, wherein the image processing unit is configured to arrange first regions, where the weights are assigned, and second regions, where no weights are assigned, to be alternately arranged in at least one direction within the detection region.

12. The surrounding surveillance apparatus of claim 10, wherein the image processing unit is configured to adjust at least one of a size of the first regions in at least one direction, a size of the second regions in the at least one direction, or a distance between the first regions and the second regions in the at least one direction based on the area occupied by the detection region within the designated region of the image.

* * * * *